P. L. KLEIN.
WOOL CARDING-MACHINES.
No. 185,332.   Patented Dec. 12, 1876.
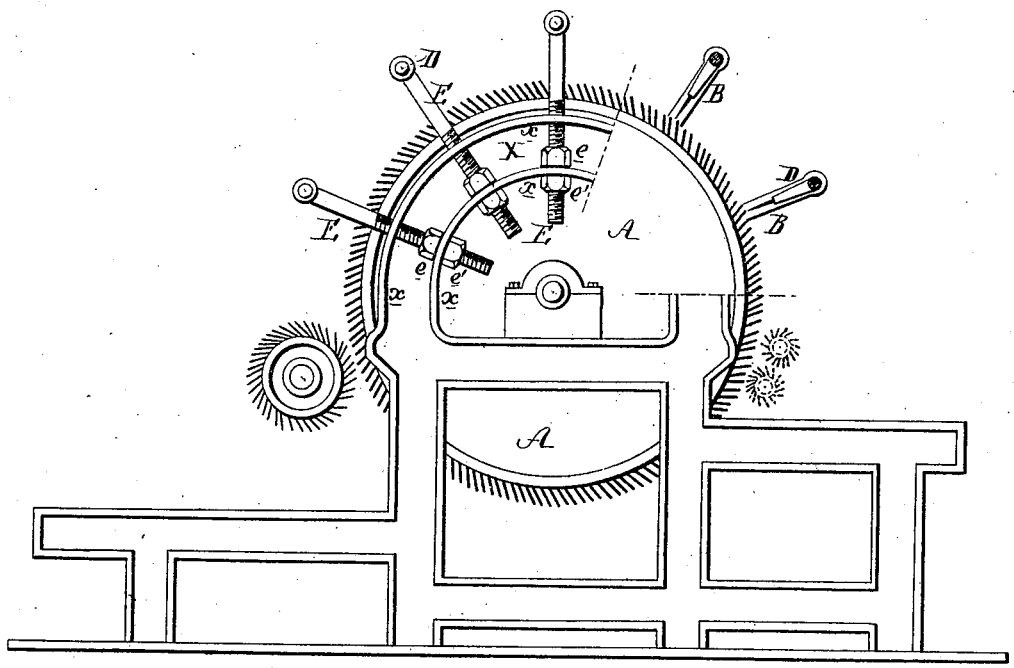
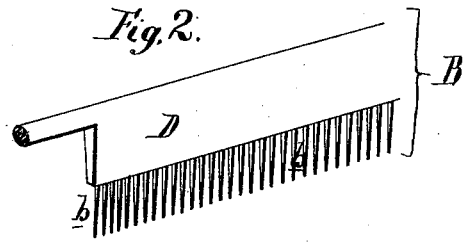

UNITED STATES PATENT OFFICE.

PETER LUDWIG KLEIN, OF WERDEN ON THE RUHR, PRUSSIA.

IMPROVEMENT IN WOOL-CARDING MACHINES.

Specification forming part of Letters Patent No. 185,332, dated December 12, 1876; application filed May 24, 1876.

*To all whom it may concern:*

Be it known that I, PETER LUDWIG KLEIN, of Werden on the Ruhr, Prussia, have invented certain Improvements in Carding-Machines, of which the following is a specification:

The object of my invention is to so construct a carding-machine in which non-rotating combs are used, that the said combs can be adjusted to different positions to suit the different materials to be carded; and this object I attain by the construction illustrated by the figure in the accompanying drawing, in which—

Fig. 1 represents a side view, partly in section, of a carding-machine with my improvements attached, and Fig. 2 a perspective view of a portion of one of the combs.

A is the main cylinder, turning in suitable bearings in the frame of the machine, in conjunction with the usual feed and delivery-rolls and doffer. The usual rotating, working, and stripping card-rolls, operating round the circumference of the main cylinder, are replaced by a series of non-rotating combs, B, as many of the combs being employed as may be found requisite. Each comb is composed of a row of straight steel teeth, $b$, of a size to accord with the material to be operated on, and secured to a transverse bar, D, the opposite ends of the bar being adapted to openings in rods E, which are secured to the arched portion X of the frame of the machine. These rods E pass through openings in the flanges $x\ x$ of the portion X of the frame, and are screw-threaded for the reception of nuts $e\ e'$, the nut $e'$ being preferably on one side of the flange, and the nut $e'$ on the opposite side, so that each forms a species of jam-nut for the other.

It will be seen then, that by manipulating these nuts, the combs can be adjusted to different positions in respect to the main cylinder to suit the different classes of material to be operated on.

I am aware that there is a machine in which combs are caused to reciprocate toward and from the cylinder, but the combs cannot be adjusted to different positions, and secured after adjustment for the purpose above described.

I claim as my invention—

The combination of the main cylinder of a carding-machine with the non-rotating combs B, which can be adjusted to different positions in respect to the main cylinder and secured after adjustment, as and for the purpose set forth.

In testimony whereof I have signed my name to this specification in the presence of two subscribing witnesses.

PETER LUDWIG KLEIN.

Witnesses:
PEYTON ERNST. ACHELIS,
JULIUS HAUSSTEIN.